United States Patent [19]

Kawamura

[11] Patent Number: 4,758,112
[45] Date of Patent: Jul. 19, 1988

[54] ROTARY SHAFT ASSEMBLY

[75] Inventor: Hideo Kawamura, Fujisawa, Japan

[73] Assignee: Isuzu Motors, Ltd., Japan

[21] Appl. No.: 887,920

[22] Filed: Jul. 22, 1986

[30] Foreign Application Priority Data

Jul. 26, 1985 [JP] Japan .............................. 60-163928

[51] Int. Cl.$^4$ .............................................. F16B 11/00
[52] U.S. Cl. .................... 403/272; 403/404; 228/124; 228/135
[58] Field of Search ............... 403/272, 271, 268, 274, 403/273, 29, 30, 28, 279, 179, 404, 270; 228/124, 135

[56] References Cited

U.S. PATENT DOCUMENTS

| | | | |
|---|---|---|---|
| 2,396,320 | 3/1946 | Gaudenzo et al. | 403/271 |
| 2,728,425 | 12/1955 | Day | 403/272 X |
| 2,842,699 | 7/1958 | Germeshausen et al. | 403/272 |
| 2,972,808 | 2/1961 | Litton | 403/272 |
| 3,302,961 | 2/1967 | Franklin | 403/272 |
| 4,111,572 | 9/1978 | Noone et al. | 403/272 |
| 4,167,351 | 9/1979 | Bindin | 403/30 |
| 4,278,195 | 7/1981 | Singh | 228/124 X |
| 4,493,378 | 1/1985 | Kyle | 403/29 |
| 4,509,880 | 4/1985 | Wamstad | 403/272 |

FOREIGN PATENT DOCUMENTS 5793606 6/1982 Japan .............................. 416/244 A Primary Examiner—Cornelius J. Husar
Assistant Examiner—Peter M. Cuomo
Attorney, Agent, or Firm—John E. Toupal; Harold G. Jarcho

[57] ABSTRACT

A rotary shaft assembly including a cylindrical ceramic shaft having first and second axially spaced apart and annular outer surface portions, the first surface portion defining a plurality of circumferentially spaced apart irregularities; a metal boss surrounding the first and second surface portions and having an axial opening defined by a first annular inner surface portion juxtaposed to the first outer surface portion and a second annular inner surface portion juxtaposed to the second outer surface portion and uniformly spaced therefrom, the first inner surface portion being deformed so as to intimately engage the irregularities in the first outer surface portion; and a metal collar disposed between the second inner and outer surface portions and sealed thereto so as to form a fluid tight seal therebetween.

20 Claims, 1 Drawing Sheet

ROTARY SHAFT ASSEMBLY

BACKGROUND OF THE INVENTION

This invention relates generally to a rotary shaft assembly and to a method for the production thereof and, more particularly, to such an assembly suitable for use in an exhaust turbo supercharger.

Rotary shafts having both ceramic and metal portions are desirable in high temperature environments such as those experienced in turbo superchargers. However, difficult problems are presented by the requirement for creating between the ceramic and metal portions a bond which is both mechanically strong and fluid tight. One method for joining a metal portion to a ceramic shaft is disclosed in Japanese patent application No. 60892/1984. According to that disclosure, a number of axially extending grooves are provided in the outer peripheral surface of a ceramic shaft and axial poles of soft metal are externally fitted therein. By heating and deforming metal at the joint between the metal and ceramic portions a composite member having mechanical strength is obtained. However, a micro-sized clearance between the fitted portions fails to provide a tight fluid seal.

The object of the present invention, therefore, is to provide a composite metal and ceramic shaft which exhibits a high mechanical strength, provides a fluid tight seal, and is stable during large thermal cycles.

SUMMARY OF THE INVENTION

The invention is a rotary shaft assembly including a cylindrical ceramic shaft having first and second axially spaced apart and annular outer surface portions, the first surface portion defining a plurality of circumferentially spaced apart irregularities; a metal boss surrounding the the first and second surface portions and having an axial opening defined by a first annular inner surface portion juxtaposed to the first outer surface portion and a second annular inner surface portion juxtaposed to the second outer surface portion and uniformly spaced therefrom, the first inner surface portion being deformed so as to intimately engage the irregularities in the first outer surface portion; and a metal collar disposed between the second inner and outer surface portions and sealed thereto so as to form a fluid tight seal therebetween. The engaged irregularities provide a strong structural bond with the boss while the collar provides a tight seal between the boss and the shaft.

According to one feature of the invention, the irregularities comprise a plurality of grooves axially oriented and circumferentially spaced apart on the first outer surface portion. The engaged grooves provide the desired mechanical strength.

According to other features of the invention, the boss comprises one axial length portion defining the second inner surface portion, and made of a metal alloy including nickel and cobalt; and the collar comprises a vitreous layer contacting the second outer surface portion, a silver solder layer contacting the second inner surface portion, and a metal oxide layer therebetween. This arrangement of materials facilitates the creation of a fluid tight seal between the boss and the shaft.

In one embodiment of the invention, the boss comprises another axial length portion defining the first inner surface portion, made of steel and welded to the one axial length portion. Cost efficiency is provided by forming the boss of length portions made of different materials.

The invention further includes a method of producing a rotary shaft assembly and comprising the steps of forming a cylindrical ceramic shaft having a first annular outer surface portion defining a plurality of circumferentially spaced apart irregularities and a second annular outer surface portion axially spaced from the first outer surface portion; covering the second outer surface with a metalic coating; providing a metalic boss with an axial opening that defines first and second axially spaced apart, annular inner surface portions; inserting the ceramic shaft into the axial opening so as to position the first inner surface portion in juxtaposition to the first outer surface portion and the second inner surface portion in juxtaposition to the second outer surface portion; applying heat and pressure to the boss so as to deform the first inner surface portion into intimate engagement with the irregularities in the first outer surface portion; and applying heat to the boss, the ceramic shaft and the coating so as to create a fluid tight seal therebetween. This method provides the desired shaft assembly with both mechanical strength and fluid tightness.

According to certain method features of the invention, the steps of applying heat to deform the first inner surface portion and to create the seal are performed simultaneously, ahd the step of applying pressure comprises the application of greater pressure on the portion of the boss defining the first inner surface portion than to the portion of the boss defining the second inner surface portion. The higher applied pressure produces the desired deformation of the boss into engagement with the irregularities while the lower applied pressure creates the desired seal without causing excessive dispersion of the molten collar.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
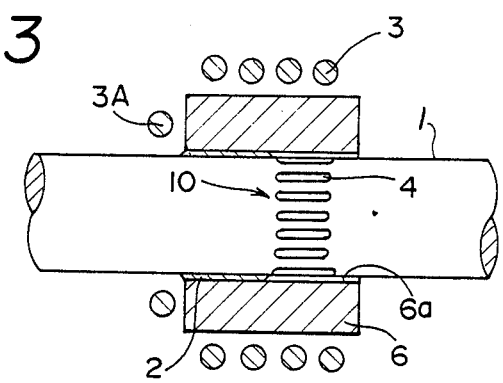
FIG. 1 is a schematic side sectional view of a shaft assembly in accordance with the present invention.
Figure 2:
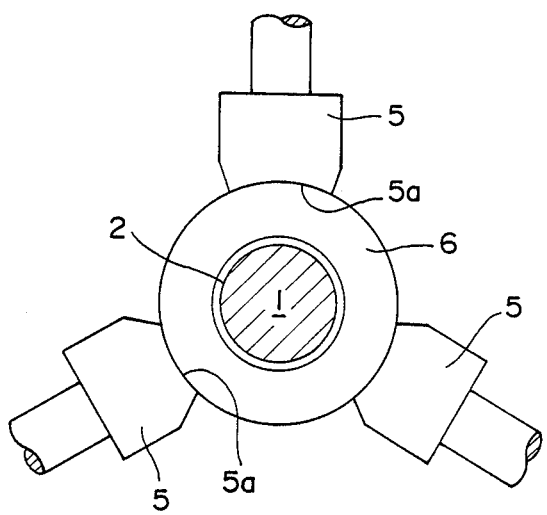
FIG. 2 is a schematic front view of the shaft assembly.

As shown in FIG. 1, a rotary shaft assembly includes a ceramic shaft 1, a metal boss 6 and a metal collar 2. In a preferred application, the shaft 1 is formed integral with a turbine wheel of an exhaust turbo supercharger (not shown). The shaft 1 has a first annular, outer surface portion 10 and a second annular outer surface portion axially spaced from the portion 10 and juxtaposed to the collar 2. Similarly, the boss 6 has a first annular, inner surface portion 6a juxtaposed to the outer surface portion 10 and a second annular, inner surface portion axially spaced from the portion 6a and juxtaposed to the collar 2. Preferably, the boss 6 is formed of a nickel-cobalt alloy having substantially the same coefficient of thermal expansion as that of ceramic. The first outer surface portion 10 is made irregular by a plurality of elongated axial grooves 4 circumferentially spaced apart on the shaft 1. Forming the collar 2 are three layers, i.e., a vitreous layer contacting the second outer surface portion of the shaft 1, a silver solder layer contacting the second inner surface portion of the boss 6 and an intermediate metal oxide layer. Since the layered metal collar 2 as described above is well known, it will not be further explained.

An axial hole defined by the surface portion 6a of the boss 6 is smoothly finished and of a diameter somewhat larger than the outside diameter of the shaft 1. After insertion into the axial hole defined by the surface 6a, the boss 6 is heated to a temperature of approximately 600° C. by a high frequency heating coil 3 arranged about its outer periphery. Pressing jigs 5 each having an arcuate depression 5a then are pressed against the boss 6. During this step, the pressure applied by the jig 5 is substantially less on the outer periphery of the collar 2 than on the portion of the boss 6 juxtaposed to the irregular surface 10.

When the boss 6 is heated by the high frequency heating coil 3, the vitreous layer of the metal collar 2 becomes molten and bonds to the ceramic shaft 1 and the silver solder layer becomes dispersed and bonded to the metal boss 6 so as to form a stabilized fluid tight seal. Simultaneously, the greater pressure applied by the jig 5 to the boss portion defining the second inner surface portion 6a creates deformation and flow thereof into the grooves 4 of the shaft. The resultant intimate engagement between the boss 6 and the shaft 1 provides a coupling of high mechanical strength.

According to another method embodiment, the collar 2 is formed by a single layer coating of a material having high wettability such as silver and platinum. Thereafter, the jig 5 is used to apply the same high pressure to the collar 2 that is applied to deform the first inner surface 6a so as to maintain the boss portion 6 at a high temperature. In response to the heat and pressure, the silver or platinum is forced into the pores of the ceramic shaft 1 to become bonded therewith and is dispersed and bonded with metal of the boss 6 to create a fluid tight seal. Also, as in the above described method, the boss 6 is deformed into the grooves 4 to provide a mechanical coupling having high strength.

During the pressure application steps, the pressing jigs 5 are evenly pressurized by oil or the like, and the boss 6 can be rotated when necessary to maintain therefor a circular outer peripheral surface. Also, instead of arranging the high frequency heating coil 3 adjacent to the outer periphery of the boss 6, a high frequency heating coil 3a can be arranged at one end thereof. In accordance with this arrangement, the boss 6 can be pressed by the jigs 5 against the shaft 1 while the coil 3a is simultaneously applying heat to thereby provide a more efficient mechanical coupling.

Figure 3:
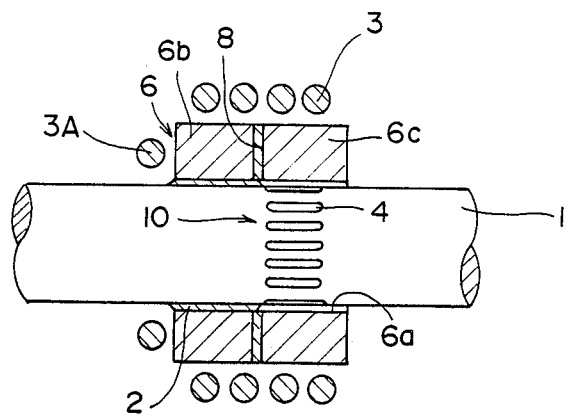
FIG. 3 is a schematic side sectional view of a modified embodiment of the present invention.

While in the above-described embodiment, the entire boss 6 is formed of a nickel-cobalt alloy, that material is primarily useful for the boss portion to be bonded to the metal collar 2. Accordingly, in the embodiment shown in FIG. 3, the boss 6 is divided into an axial length portion 6b formed of nickel-cobalt alloy and an axial length portion 6c formed of steel. The length portions 6b and 6c are welded together at a butt 8 to form the composite boss 6. This arrangement reduces significantly the quantity of expensive nickel-cobalt alloy required.

Generally speaking, the creation of strong bonds between ceramic and metal is quite difficult. As for alumina and silicon carbide, bonding thereof with metal is possible but coupling strength is weak. On the other hand bonds between silicon nitride, zirconia etc. and metal are very unstable. These problems are solved in the present invention by deforming the boss 6 into intimate engagement with the irregularities 4 in the shaft 1. However, there exist between the shaft portion 10 and the boss portion 6a regions of clearance that negate a fluid tight seal therebetween. Accordingly, the desired seal is created by bonding the collar 2 between the boss 6 and the shaft 1. Thus, the invention provides a composite rotary shaft assembly having a ceramic shaft portion that remains stably mechanically coupled and fluid tightly sealed to a metal boss even when subjected to large thermal cycles. When the assembly is used to couple a turbine wheel of an exhaust turbo supercharger to a blower wheel, therefore, a mechanically stable coupling is provided and the leakage of hot gases is prevented between the turbine and the blower.

Obviously, many modifications and variations of the present invention are possible in light of the above teachings. It is to be understood, therefore, that the invention can be practiced otherwise than as specifically described.

What is claimed:
1. A rotary shaft assembly comprising:
 a cylindrical ceramic shaft having first and second axially spaced apart and annular outer surface portions, said first surface portion defining a plurality of circumferentially spaced apart irregularities;
 a metal boss surrounding said first and second surface portions and having an axial opening defined by a first annular inner surface portion juxtaposed to said first outer surface portion and a second annular inner surface portion juxtaposed to said second outer surface portion and uniformly spaced therefrom, said first inner surface portion being deformed so as to intimately engage said irregularities in said first outer surface portion; and
 a metal collar disposed between said second inner and outer surface portions and sealed thereto so as to form a fluid tight seal therebetween.
2. An assembly according to claim 1 wherein said irregularities comprise a plurality of grooves in said first outer surface portion.
3. An assembly according to claim 2 wherein said grooves are axially oriented and are circumferentially spaced apart on said first outer surface portion.
4. An assembly according to claim 3 wherein said boss comprises one axial length portion defining said second inner surface portion, and made of a metal alloy including nickel and cobalt.
5. An assembly according to claim 4 wherein said collar comprises a plurality of layers.
6. An assembly according to claim 5 wherein said layers comprise a vitreous layer contacting said second outer surface portion, a silver solder layer contacting said second inner surface portion, and a metal oxide layer therebetween.
7. An assembly according to claim 4 wherein said boss comprises another axial length portion defining said first inner surface portion, made of steel and welded to said one axial length portion.
8. An assembly according to claim 7 wherein said collar comprises a plurality of layers.
9. An assembly according to claim 8 wherein said layers comprise a vitreous layer contacting said second outer surface portion, a silver solder layer contacting said second inner surface portion, and a metal oxide layer therebetween.

10. An assembly according to claim 1 wherein said boss comprises one axial length portion defining said second inner surface portion, and made of a metal alloy including nickel and cobalt.

11. An assembly according to claim 10 wherein said collar comprises a plurality of layers.

12. An assembly according to claim 11 wherein said layers comprise a vitreous layer contacting said second outer surface portion, a silver solder layer contacting said second inner surface portion, and a metal oxide layer therebetween.

13. A method of producing a rotary shaft assembly and comprising the steps of:
forming a cylindrical ceramic shaft having a first annular outer surface portion defining a plurality of circumferentially spaced apart irregularities and a second annular outer surface portion axially spaced from said first outer surface portion;
covering said second outer surface with a metalic coating;
providing a metalic boss with an axial opening that defines first and second axially spaced apart, annular inner surface portions;
inserting said ceramic shaft into said axial opening so as to position said first inner surface portion in juxtaposition to said first outer surface portion and said second inner surface portion in juxtaposition to said second outer surface portion;
applying heat and pressure to said boss so as to deform said first inner surface portion into intimate engagement with said irregularities in said first outer surface portion; and
applying heat to said boss, said ceramic shaft and said coating so as to create a fluid tight seal therebetween.

14. An assembly according to claim 13 wherein said boss comprises one axial length portion defining said second inner surface portion, and made of a metal alloy including nickel and cobalt.

15. A method according to claim 14 wherein said covering step comprises the steps of applying a vitreous layer over said second outer surface portion, applying a metal oxide layer over said vitreous layer, and applying a silver solder layer over said metal oxide layer.

16. A method according to claim 15 wherein said steps of applying heat to deform said first inner surface portion and to create said seal are performed simultaneously, and said step of applying pressure comprises the application of greater pressure on the portion of said boss defining said first inner surface portion than to the portion of said boss defining said second inner surface portion.

17. A method according to claim 16 wherein said irregularities comprise a plurality of grooves in said first outer surface portion.

18. A method according to claim 17 wherein said grooves are axially oriented and are circumferentially spaced apart on said first outer surface portion.

19. A method according to claim 18 wherein said boss comprises another axial length portion defining said first inner surface portion, made of steel, and welded to said one axial length portion.

20. A method according to claim 14 wherein said coating is a highly wettable material from the group including silver and platinum; and including the step of applying pressure between said boss, said shaft and said coating during the creation of said seal.

* * * * *